United States Patent [19]
Clifton et al.

[11] Patent Number: 6,043,797
[45] Date of Patent: *Mar. 28, 2000

[54] COLOR AND LUMINANCE CONTROL SYSTEM FOR LIQUID CRYSTAL PROJECTION DISPLAYS

[75] Inventors: Benjamin R. Clifton, Oregon City; Paul E. Gulick, Tualatin; John P. Fogarty, Oregon City, all of Oreg.

[73] Assignee: Clarity Visual Systems, Inc., Wilsonville, Oreg.

[*] Notice: This patent issued on a continued prosecution application filed under 37 CFR 1.53(d), and is subject to the twenty year patent term provisions of 35 U.S.C. 154(a)(2).

[21] Appl. No.: 08/740,966

[22] Filed: Nov. 5, 1996

[51] Int. Cl.[7] .............................. G09G 5/00; G09G 3/36; H04N 5/202; H04N 5/64

[52] U.S. Cl. ................................ 345/1; 345/88; 348/655; 348/675; 348/744

[58] Field of Search ................................. 345/1, 20, 22, 345/88, 89; 348/655, 656, 661, 744, 675, 708, 760, 761, 766, 751; 358/447, 519

[56] References Cited

U.S. PATENT DOCUMENTS

| | | | |
|---|---|---|---|
| 4,386,345 | 5/1983 | Narveson et al. | 340/703 |
| 4,912,558 | 3/1990 | Easterly et al. | 358/447 |
| 5,298,892 | 3/1994 | Shapiro et al. | 345/88 |
| 5,302,946 | 4/1994 | Shapiro et al. | 345/88 |
| 5,315,378 | 5/1994 | Satou et al. | 348/655 |
| 5,396,257 | 3/1995 | Someya et al. | 345/1 |
| 5,680,180 | 10/1997 | Huang | 348/656 |

FOREIGN PATENT DOCUMENTS

| | | | |
|---|---|---|---|
| 0595649 | 5/1994 | European Pat. Off. | H04N 17/04 |
| 9115931 | 10/1991 | WIPO | H04N 17/02 |

OTHER PUBLICATIONS

"Correcting Method for Gradation of Projection Type Liquid Crystal Display and Correcting Device for Gradation", Kuzumoto Keiichi, Patent Abstracts of Japan, Pub. No. 07056545, Mar. 3, 1995.

"LCD Rear Projector with Improved Picture Quality for HDTV", Yokozawa et al., May 17, 1992, Society for Information Display, SID 92 Digest, pp. 281–284.

Takeuchi et al., "A 750–TV–Line–Resolution Projector Using 1.5–Megapixel a–Si TFT LC Modules," SID 91 Digest, pp. 415–418.

PICBLOC 3 "The Processing Power Behind the Image" brochure by Electrosonic Systems, Inc., 1995.

PROCUBE AC "High Performance for High Impact Video Displays" brochure by Electrosonic Systems, Inc., 1995.

*Primary Examiner*—Jeffery Brier
*Assistant Examiner*—David L. Lewis
*Attorney, Agent, or Firm*—Stoel Rives LLP

[57] ABSTRACT

A liquid crystal display ("LCD") projection unit (12) employs a luminance and color balance system having a lookup table (100) storing multiple sets of gain and/or gamma corrected responses (92–99) for color balance and luminance control. The lookup table values are determined by measuring an S-curve response (90) of an LCD array (40) for each of a set of R, G, and B input data values, converting the S-curve responses to a corresponding set of gamma responses, and scaling the gamma responses to generate red ("R"), green ("G"), and blue ("B") families of gain and gamma corrected values. Color balance is adjusted by selecting the particular R, G, and B families of gain and gamma corrected values that cause the LCD projection unit to match a predetermined ratio of maximum R, G, and B luminance values. Luminance is adjusted by selecting families of lookup table values that adjust the transmittance of the LCD while maintaining the color balance. The LCD projection unit achieves a uniform luminance and color balance that renders it suitable for use in a multiscreen display system (10).

21 Claims, 6 Drawing Sheets

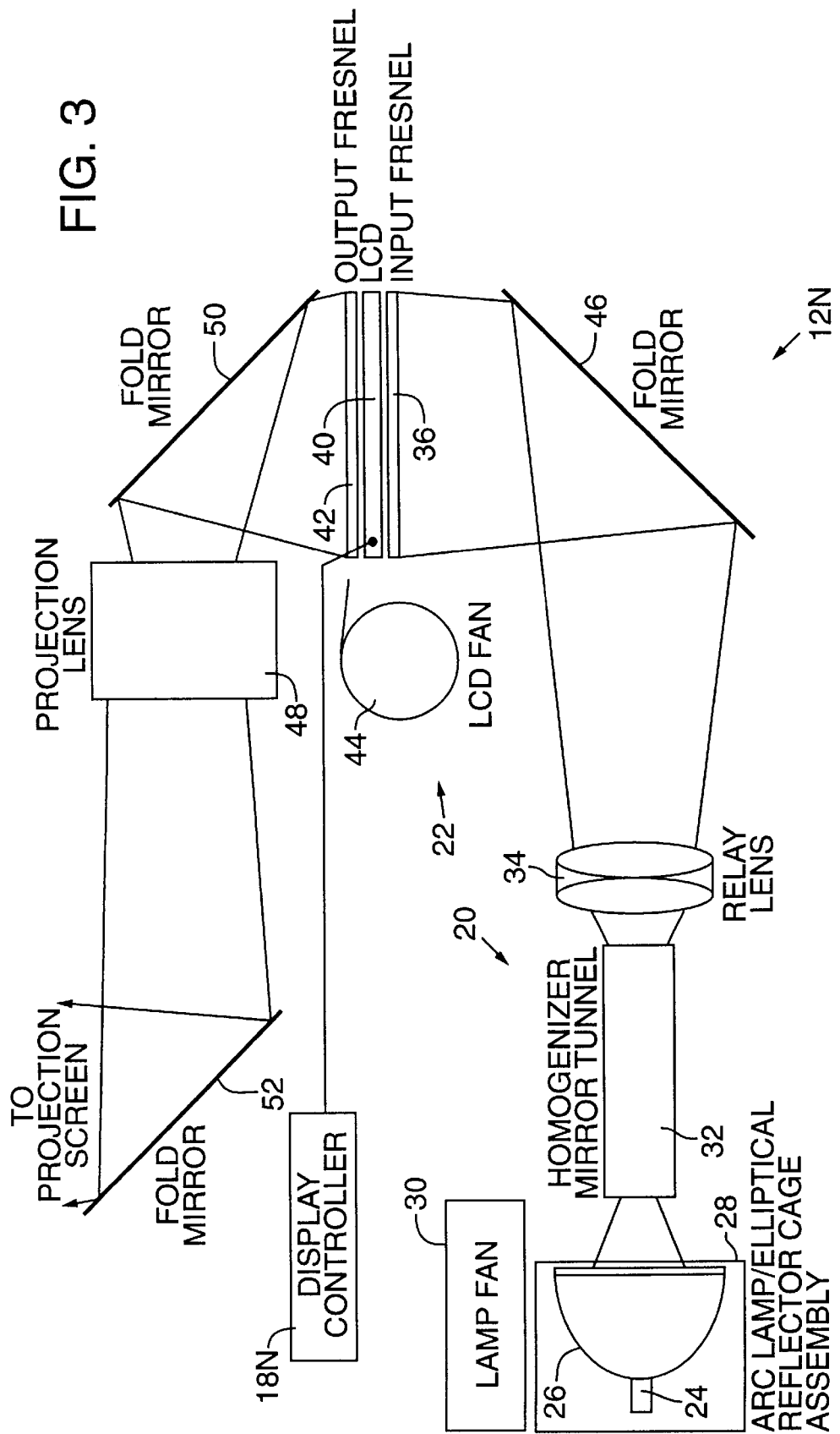

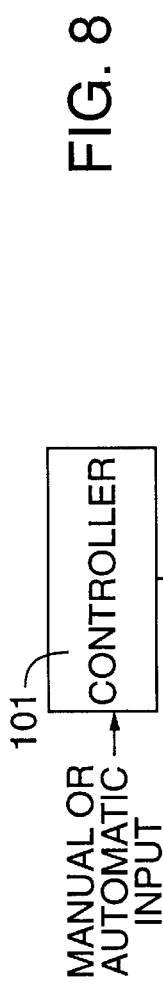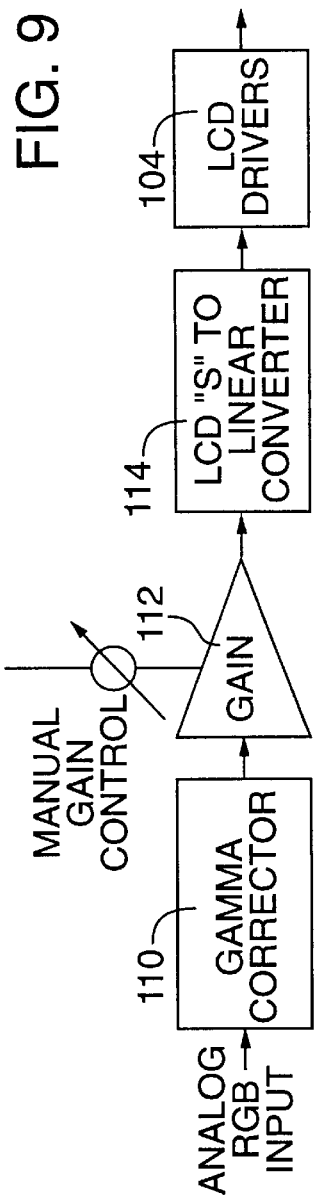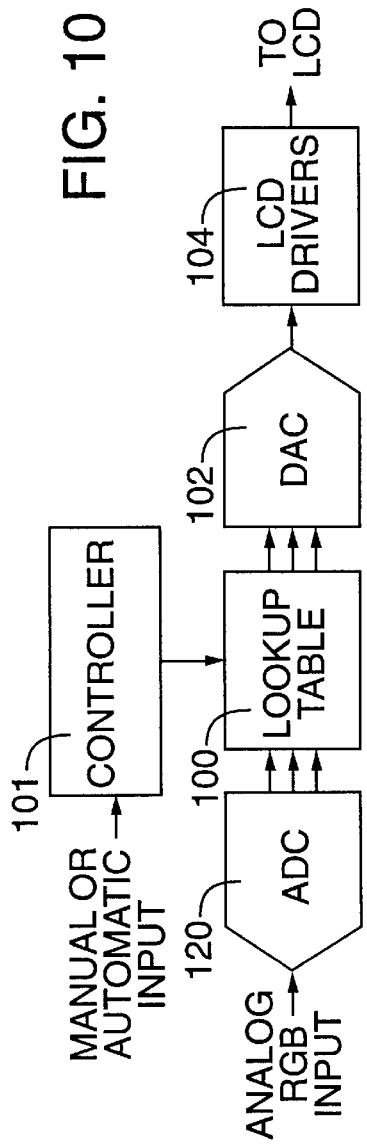

COLOR AND LUMINANCE CONTROL SYSTEM FOR LIQUID CRYSTAL PROJECTION DISPLAYS

TECHNICAL FIELD

This invention relates to video display devices and more particularly to a color and luminance control system for liquid crystal projection displays that facilitates their use in multiscreen applications.

BACKGROUND OF THE INVENTION

There are previously known apparatus and methods for employing arrays of cathode-ray tube ("CRT") displays in "video walls" and signage applications. Multiscreen displays employ an abutted array of substantially identical display devices that each display a subdivided portion of a total image such that together they display the total image. Because multiscreen displays require that each of the display devices be perceived as part of a single large display device, it is important to make the boundaries between adjacent display devices appear as inconspicuous as possible.

Unfortunately, the human eye is very sensitive to boundary discontinuities, making a "seamless" multiscreen display very difficult to produce. This is especially true for arrays of CRT displays because of their nonrectangular shapes, curved faceplates, and nondisplayable borders. Of course, it is also important to electronically subdivide the video so that each display seamlessly displays only its portion of the total image.

Nevertheless, prior workers have successfully overcome many of these problems by employing arrays of projection CRT displays coupled to intelligent video display controllers. An exemplary multiscreen display system employs an array of PROCUBE AC CRT projection displays coupled to a PICBLOC 3 display controller, both of which are manufactured by Electrosonic Systems, Inc. of Minneapolis, Minn.

Moreover, there is also a need for luminance uniformity and color balance among the displays in an array because the human eye also easily perceives luminance and color differences between adjacent displays. Therefore, the above-described system employs a manually operated luminance and color balancing system and an optional external image sensor with which the luminance and color of each CRT projection display may be manually set to match a predetermined factory standard.

Indeed, even color and luminance shading variations in an individual display can degrade the total image displayed on a multiscreen display. For example, U.S. Pat. No. 5,396,257, issued May 7, 1995, for MULTISCREEN DISPLAY APPARATUS describes a CRT-based color and luminance sampling and correction system that corrects for shading differences in each display. The system employs an intelligent controller to coordinate luminance and color samples from each display and store correction data in lookup tables that are associated with each display, but which also account for the color and luminance of the overall multiscreen display.

Despite this prior work, CRT-based multiscreen displays still have image stability, weight, form factor, and image matching problems. Clearly, a digitally addressed, compact, lightweight display would solve many of these problems. Liquid crystal projection displays have evolved to a point where many of the above problems can be solved. For example, "A 750-TV-Line-Resolution Projector Using 1.5-Megapixel a-Si TFT LC Modules," Takeuchi et al., Society for Information Display, SID 91 DIGEST, pp. 415–418, describes such a display. Unfortunately, liquid crystal displays have not been readily accepted for use in multiscreen display applications because they have projection lamp-induced luminance variations and liquid crystal display transfer function variations that make color balancing difficult. Referring to FIG. 1A, a typical transfer function of a liquid crystal display ("LCD") is an S-curve shaped response 2 that produces a relative LCD luminance that is nonlinear with respect to its relative drive voltage. Assume that the "gain" of the LCD is reduced to 80 percent of its maximum value by attenuating its maximum drive voltage. Its reduced gain response is the portion of S-curve shaped response 2 that is bounded by dashed lines 4, and is clearly not an S-curve. The portion of S-curve shaped response 2 bounded by dashed lines 4 is shown in FIG. 1B as reduced gain response 6, and is overlayed therein with S-curve shaped response 2. Now, if two LCDs each having S-curve shaped response 2 are employed in a color LCD, and one of them is operating at the reduced gain to achieve a predetermined color balance, the overall response of the color LCD is as shown in FIG. 1B. One LCD operates with S-curve shaped response 2, and the other operates with reduced gain response 6. Comparing the two responses shows that a 1.0 relative drive voltage produces maximum output from each LCD (remember that the reduced gain LCD provides only 0.8 the relative luminance of the other LCD). Of course, at 0.0 relative drive voltage, both LCDs produce zero relative luminance. However, at an intermediate 0.7 relative drive voltage, the LCD with response 2 provides 0.82 relative luminance, whereas the LCD with reduced gain response 6 provides only 0.44 relative luminance. Indeed, most intermediate values of drive voltage will produce unbalanced amounts of relative luminance. In a color LCD having two or more LCDs, this unbalance causes unacceptable color shifts as the relative drive voltage changes. Moreover, neither S-curve response 2 nor gain corrected response 6 matches the well-known gamma curve response employed by conventional video signal sources to match the nonlinear luminance response of the human eye.

What is needed, therefore, is a color balance and luminance correction apparatus and method for liquid crystal projection displays that renders them suitable for use in color and/or multiscreen display applications.

SUMMARY OF THE INVENTION

An object of this invention is, therefore, to provide an apparatus and a method that correct the luminance and color balance of a liquid crystal projection display.

Another object of this invention is to provide an apparatus and a method that render uniform the luminance and color balance of liquid crystal projection displays used in a multiscreen display.

A further object of this invention is to provide an apparatus and a method for adjusting the luminance and color balance of a liquid crystal projection display.

An LCD projection unit of this invention employs a luminance and color balance system employing an LCD array characterization lookup table storing multiple sets of luminance and gamma correction values that are user selectable to control luminance and color balance. The lookup table values are determined by measuring the transmitted luminance of the LCD array in the projection unit for each of a set of red ("R"), green ("G"), and blue ("B") input data values, converting the resulting S-curve responses to a corresponding set of gamma responses and scaling the gamma responses to generate multiple R, G, and B families of luminance and gamma corrected values. Color balance is adjusted by selecting the particular R, G, and B families of luminance and gamma corrected values that cause the LCD projection unit to match a predetermined ratio of R, G, and B luminance values. Luminance is adjusted by selecting sets of families of R, G, and B luminance values that maintain the color balance ratio while causing the LCD to transmit the desired overall luminance. The LCD projection unit has a readily adjustable luminance that does not interact with the color balance, thereby rendering it suitable for use in a multiscreen display system.

Additional objects and advantages of this invention will be apparent from the following detailed description of a preferred embodiments thereof that proceeds with reference to the accompanying drawings.

BRIEF DESCRIPTION OF THE DRAWINGS

FIG. 3 is a simplified block diagram of an LCD projection unit of this invention that is suitable for use in the multiscreen display system of FIG. 2.

FIG. 8 is a simplified block diagram of a preferred digital embodiment of a luminance and color balance controller of this invention.

FIG. 9 is a simplified block diagram of an alternative analog embodiment of the luminance and color balance controller of this invention.

FIG. 10 is a simplified block diagram of an alternative hybrid analog/digital embodiment of the luminance and color balance controller of this invention.

DETAILED DESCRIPTION OF PREFERRED EMBODIMENTS

Figure 1A:
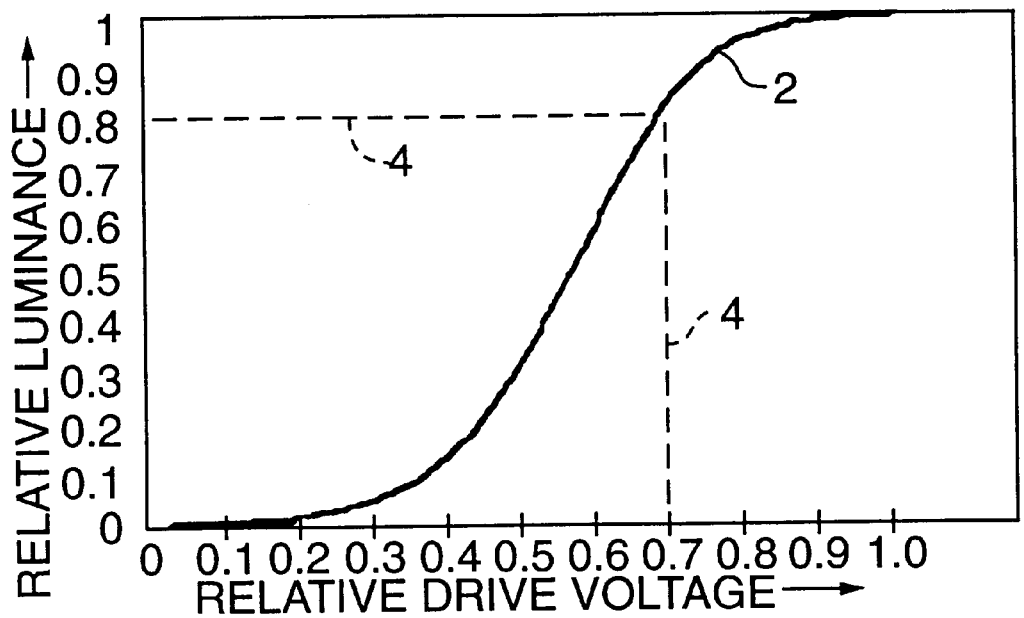
FIGS. 1A and 1B are graphical representations of prior art LCD S-curve responses resulting from different relative drive voltage levels.
Figure 1B:
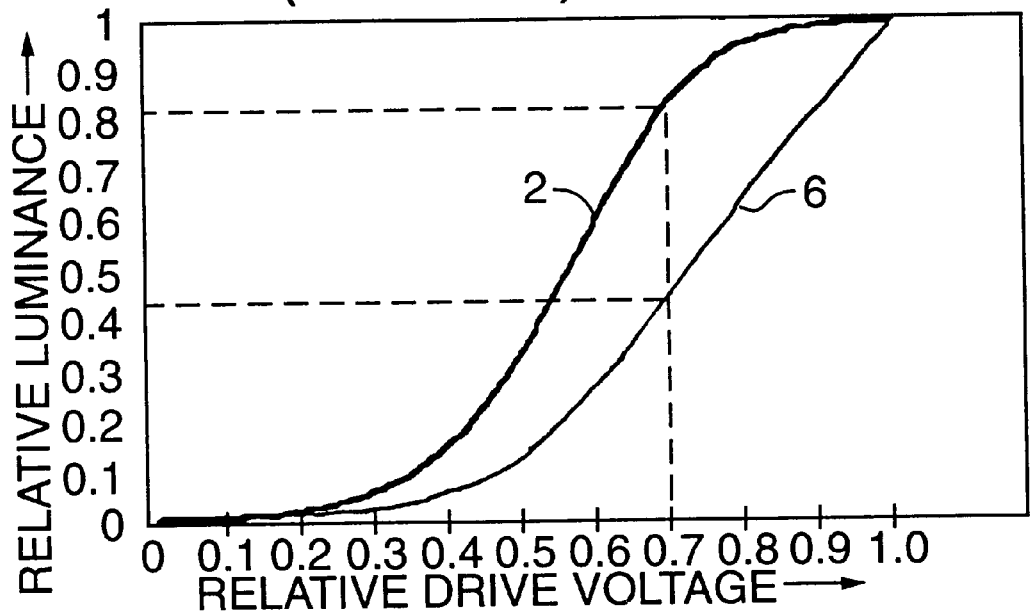
Figure 2:
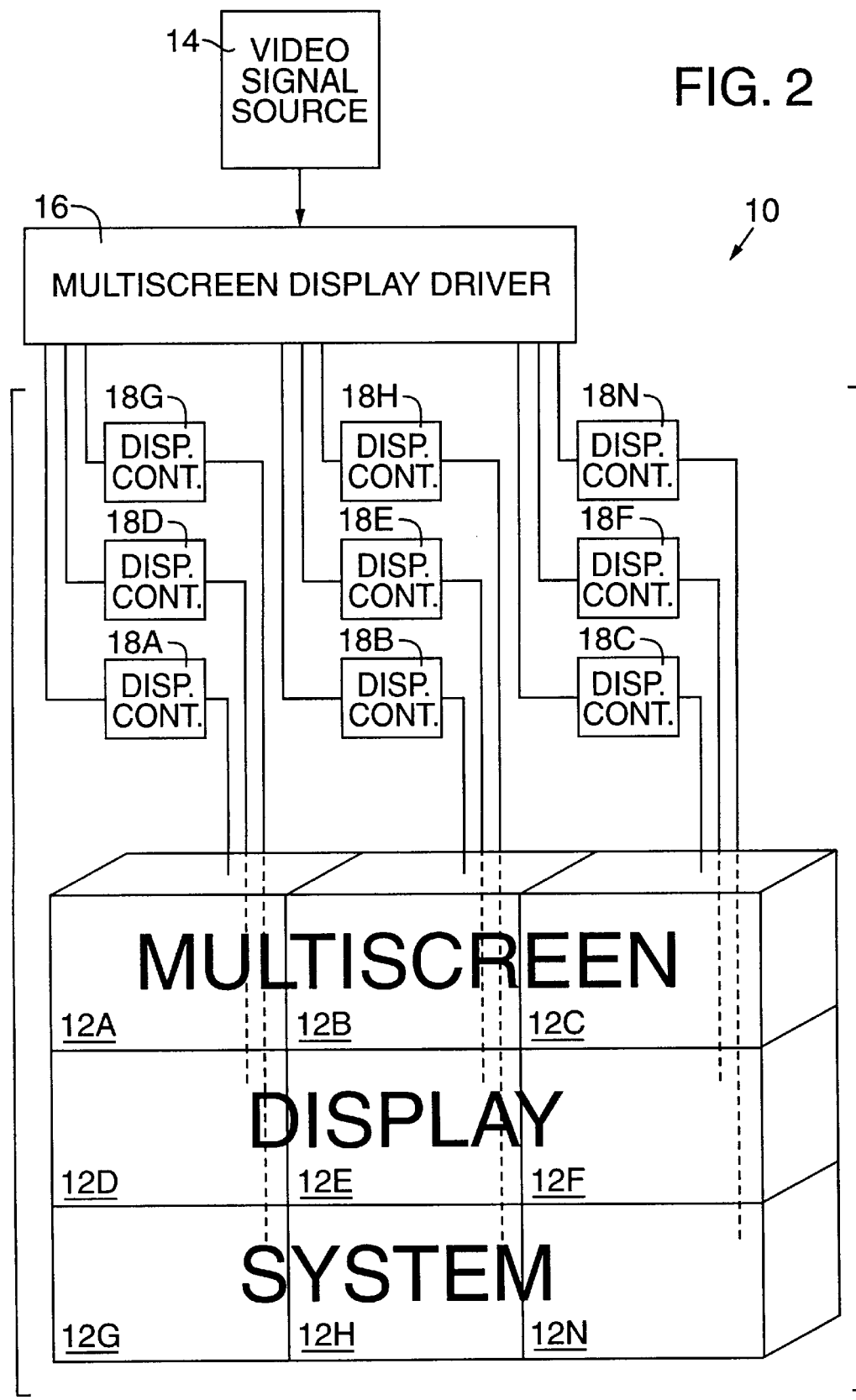
FIG. 2 is a simplified pictorial block diagram of a representative multiscreen display system suitable for use with this invention.

FIG. 2 shows an exemplary multiscreen display system 10 employing a three-by-three array of LCD projection units 12A, 12B, . . . to 12N (collectively LCD projection units 12). Of course, N may be as small as two and as big as practical to form a very large array of LCD projection units. Of course, this invention may also be employed in stand-alone LCD units. A conventional video signal source 14 drives a conventional multiscreen display driver 16, such as the PICBLOC 3 unit described in the background section of this application. Each of LCD projection units 12 is interconnected with multiscreen display driver 16 by associated display controllers 18A, 18B, . . . , to 18N, which perform LCD projection unit luminance and color balance functions as described below with reference to FIGS. 4–10. Display controllers 18 are preferably integrated within projection units 12. Multiscreen display system 10 seamlessly displays a total image having a substantially uniform luminance and color balance.

As mentioned above, LCD projection displays have not been readily accepted for use in multiscreen display applications because they have lamp assembly-induced luminance and color variations and LCD optical path nonlinearities that make color balancing difficult.

FIG. 3 shows a representative one, for example 12N, of LCD projection units 12, which is suitable for use with this invention. LCD projection unit 12N includes two primary subsections: a lamp assembly 20 and an LCD assembly 22.

Lamp assembly 20 preferably includes a tungsten halogen or metal halide arc lamp 24 enclosed in an elliptical reflector 26 and housed in a cage assembly 28, all of which are cooled by a lamp fan 30. Arc lamp 24 is preferably a model L5341 manufactured by Hamamatsu Photonics K.K., located in Hamamatsu, Japan. Lamp assembly 20 further includes a homogenizer mirror tunnel 32 and a relay lens 34 that may have an optional integral ultraviolet/infrared ("V/IR") filter such that LCD assembly 22 is supplied with a substantially uniform field of visible light.

Regarding luminance variations in lamp assembly 20, aging factors primarily include dimming over time of arc lamp 24 and degradation of coatings on elliptical reflector 26 and any optional UV/IR filter in relay lens 34. These aging factors reduce the overall luminance and change the color of the light reaching LCD assembly 22.

The lifetime rating of a typical tungsten halogen or metal halide arc lamp is based on the mean life of the lamp to 50 percent of its initial luminance. Moreover, the luminance of new lamps varies by as much as 20 percent. These two factors account for a possible 60 percent luminance variation between LCD projection units 12 in multiscreen display system 10.

LCD assembly 22 preferably includes input Fresnel lens 36, an optional attenuator polarizer (not shown), an LCD array 40, and an output Fresnel lens 42, all of which are cooled by an LCD fan 44. The optional attenuator polarizer provides luminance control without any color balance interaction. However, because the polarizer absorbance limits the luminance available from LCD projection unit 12, a preferred luminance control technique is described later with reference to FIGS. 3 and 7.

LCD array 40 is preferably a model LQ64P312 manufactured by Sharp Microelectronics located in Nara, Japan. LCD assembly 22 is optically coupled to lamp assembly 20 by an input fold mirror 46 and is optically coupled to a projection screen (not shown) by a projection lens 48 and fold mirrors 50 and 52.

Regarding color and light transmittance variations in LCD assembly 22, LCD array 40 manufacturing process and lot variations affect the transmitted luminance and color modulation of the light received from lamp assembly 20, thereby causing the luminance and color of the image on the projection screen to vary among projection units 12. It is possible that LCD assembly 22 variations also occur over time because color filters and polarizers change with temperature and prolonged exposure to intense light. Temperature variations among LCD projection units 12 may also introduce color and luminance variations. However, these variations account for less than about a 5 percent difference in luminance and considerably less in color.

The variables controlling luminance and color in LCD projection units 12 may be modeled as an overall transfer function of the R, G, and B video input voltages to an image spectral output defining color and luminance values. In the overall transfer function, every unique combination of R, G, and B input voltages results in a spectral response perceived as a color with a particular luminance value. This invention maintains a substantially uniform overall transfer function among LCD projection units 12 as the lamp assembly 20 and LCD assembly 22 variables change.

The overall transfer function may be modeled as a combination of a lamp assembly 20 spectrum model and an LCD assembly 22 spectrum model.

Figure 4A:
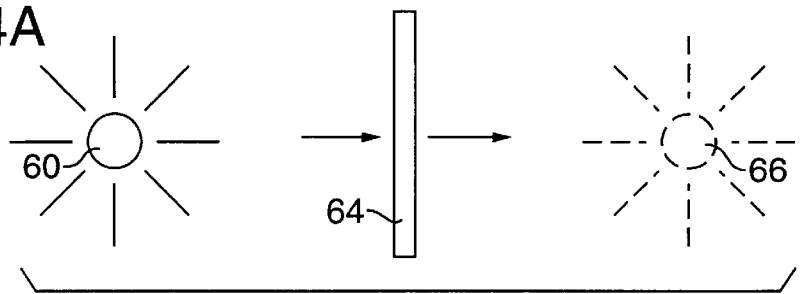
FIGS. 4A–4C are simplified pictographical representations of a lamp assembly spectrum model of the LCD projection unit of FIG. 3.
Figure 4B:
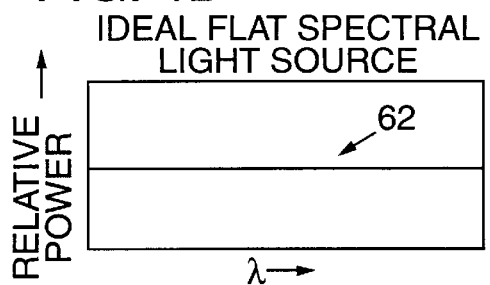
Figure 4C:
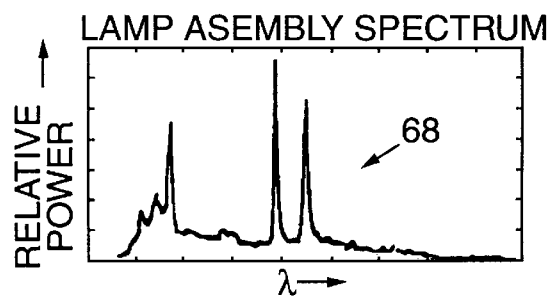

FIGS. 4A–4C show the development of a lamp assembly spectrum model for LCD projection units 12. FIG. 4A depicts the overall lamp assembly spectrum model as an ideal lamp 60 having an ideal flat light spectrum 62 as shown in FIG. 4B combined with a modeling filter 64 describing the combined effects of elliptical reflector 26, any optional UV/IR filter in relay lens 34, and the actual spectral output of arc lamp 24 (all of FIG. 3). Variations in these components result in different modeling filters. The resultant lamp assembly spectrum model is a modeled lamp assembly 66 (shown in dashed lines) having a modeled lamp assembly spectrum 68 as shown in FIG. 4C.

Figure 5A:
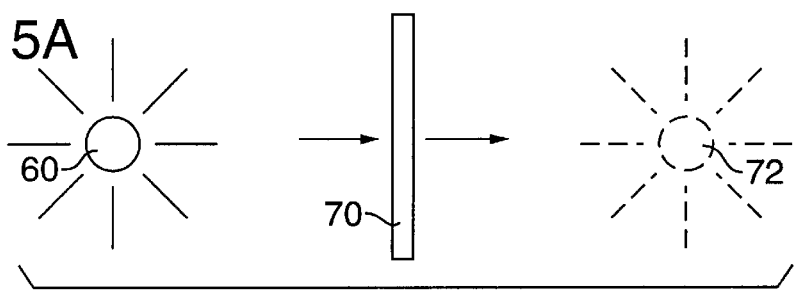
FIGS. 5A–5C are simplified pictographical representations of an LCD spectrum model of the LCD projection unit of FIG. 3.
Figure 5B:
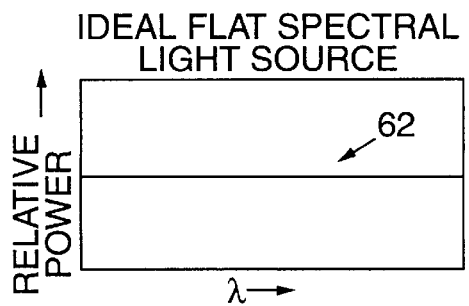
Figure 5C:
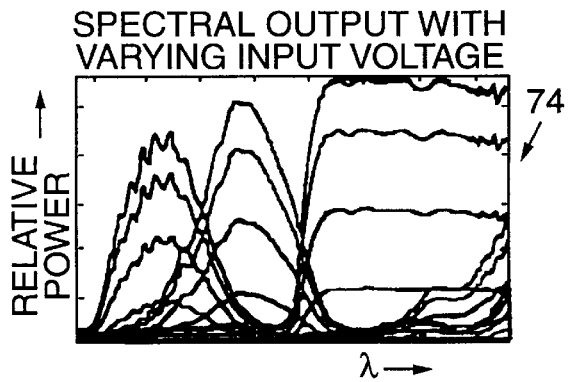

In like manner, FIGS. 5A–5C show the development of an LCD and polarizer assembly spectrum model for LCD projection units 12. FIG. 5A again shows ideal lamp 60 having ideal flat light spectrum 62 as shown in FIG. 5B. However, this time ideal lamp 60 is combined with a modeling filter 70 describing the combined effects of input Fresnel lens 36, any optional attenuator polarizer, LCD array 40, and output Fresnel lens 42 (all of FIG. 3) in response to a set of R, G, and B input voltages. Again, variations in these components result in different modeling filters. The resultant LCD and polarizer assembly spectrum model is a modeled LCD and polarizer assembly 72 (shown in dashed lines) having a set of modeled LCD and polarizer transmission spectra 74 as shown in FIG. 5C.

Figure 6A:
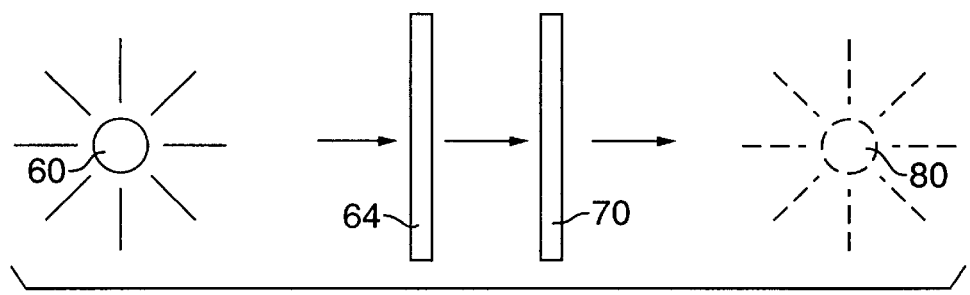
FIGS. 6A–6C are simplified pictographical representations of an overall spectral transmission model of the LCD projection unit of FIG. 3.
Figure 6B:
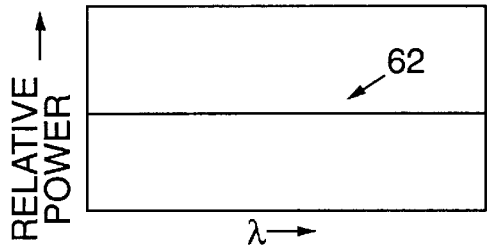
Figure 6C:
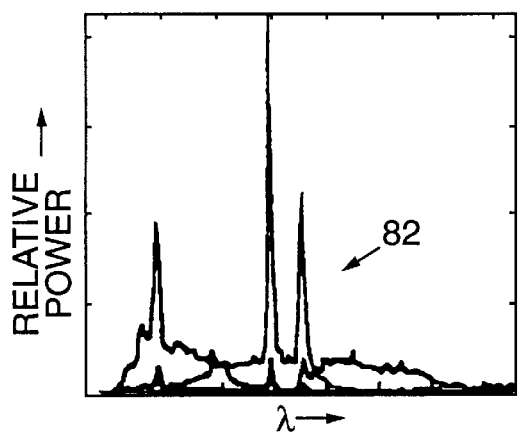

It then follows that FIGS. 6A–6C show the development of an overall transfer function model for exemplary LCD projection unit 12N of FIG. 3. FIG. 6A again shows ideal lamp 60 having ideal flat light spectrum 62 as shown in FIG. 6B. However, this time ideal lamp 60 is combined with a cascaded combination of lamp assembly modeling filter 64 and LCD and polarizer assembly modeling filter 70. The resultant overall transfer function model is a modeled projection unit 80 (shown in dashed lines) having a set of modeled light projection spectra 82 as shown in FIG. 6C. Unlike the multiple amplitudes of spectra shown in FIG. 5C, to improve clarity, FIG. 6C shows only a single spectrum amplitude for each primary color. Skilled workers will understand that multiple amplitudes of spectra exist and depend on the R, G, and B input voltages to modeled projection unit 80.

Referring again to FIG. 2, LCD projection units 12 cooperate with a color and luminance control system incorporated within display controllers 18 to maintain luminance uniformity and color balance among all the LCD projection units forming multiscreen display system 10. Its goal is to maintain luminance uniformity and color balance with a minimum of user adjustment during the rated life of multiscreen display system 10. In practice, calibration of the color and luminance control system is characterized to the S-curve response of the particular model of LCD array 40 employed. Thereafter, when LCD projection units 12 are manufactured, color balance adjustments are usually stable for extensive time periods, with luminance adjustments being required only when arc lamp 24 is replaced. Of course, both color balance and luminance adjustments may be made at any time to suit particular application requirements or user tastes. Skilled workers will also recognize that LCD array 40 need not be a unitary multicolored array, but that this invention also applies to display systems employing separate LCDs for each color. In such a case, the S-curve responses for each LCD would be separately measured.

The color and luminance control system employs the principles of independent luminance and color control revealed by the modeled projection unit 80 (FIGS. 6A–6C) and as described in more detail below.

Color and luminance balance may be implemented according to at least two methods. A first method employs establishing reference color and luminance values and adjusting LCD projection units 12 to achieve those values. To obtain the maximum useful lifetime from arc lamp 24 (FIG. 3), the reference luminance value is preset to its expected end of life luminance value (50 percent of its initial luminance). This results in LCD projection units 12 that may never achieve their maximum potential luminance, but which are "plug and play" luminance and color balanced according to the reference values.

A second, preferred method, employs setting the reference luminance value to the lowest common value of maximum luminance among the set of LCD projection units 12 to be used in multiscreen display system 10. This method is advantageous because the reference luminance value is not arbitrarily set to a predetermined minimum level but is set to the highest value possible for luminance and color balance capability among the set of LCD projection units employed.

In both of these methods, the color balance is established by setting a selected ratio of R, G, and B luminance values. The ratio is preferably user adjustable and defines a white point or color temperature for multiscreen display system 10.

For each associated pair of LCD projection units 12 and display controllers 18, the color and luminance control system employs a master luminance control that controls the overall luminance of the LCD projection unit without changing its color balance and a gamma correction adjustment that controls the gain settings of each color individually while converting the transfer function of LCD array 40 from its characteristic S-curve response into a well-known gamma curve. The gamma curve is suitable for matching sets of R, G, and B video input voltages from video signal source 14 to corresponding luminance and color values that are linearly perceived by a human eye.

A master luminance control may be implemented to a limited extent by simply adjusting the supply voltage to arc lamp 24. However, reducing the supply voltage to arc lamp 24 beyond a small amount causes undesirable color shifts and unreliable operation of the lamp. Therefore, because of the wide luminance control range required, it is preferred to operate arc lamp 24 at its rated voltage and adjust the operating range of LCD array 40 accordingly. How this is done without altering the color balance is described below with reference to FIGS. 3 and 7.

LCD array 40, being of a particular type and manufacturer, has a corresponding LCD S-curve response at its operating temperature. Therefore, the particular S-curve response for LCD array 40 is measured at its operating temperature, preferably 40 degrees Celsius, for each primary color using lamp assembly 20 as an illumination source.

This is necessary because the particular filter materials, LCD design characteristics, and operating temperature ranges employed may cause differences in the R, G, and B S-curve responses.

Figure 7:
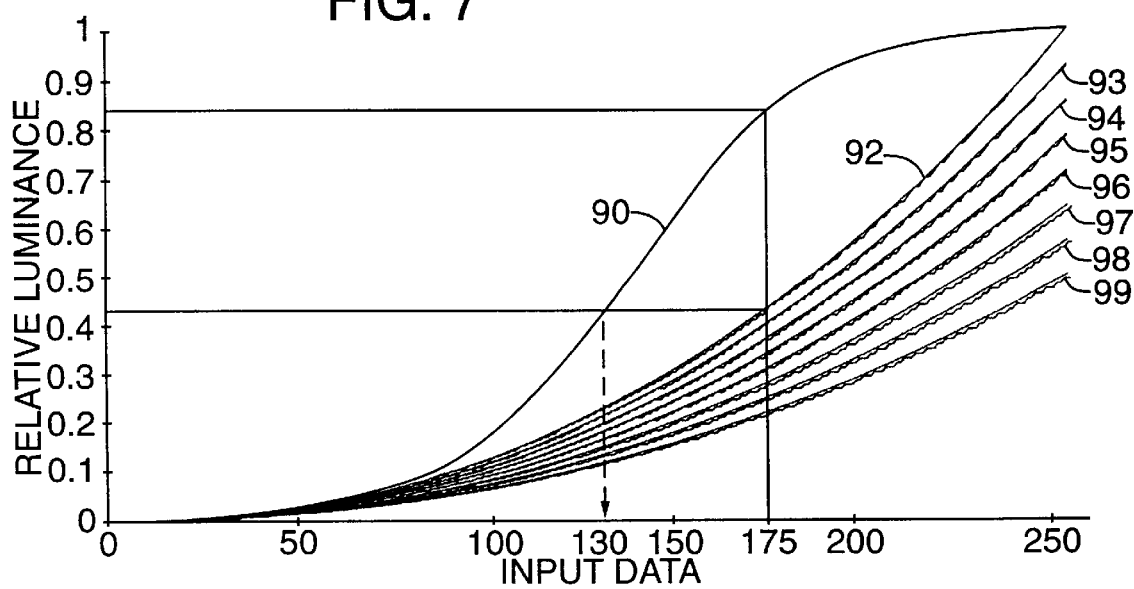
FIG. 7 is a graphical representation of an LCD S-curve response and a corresponding set of gamma response curves generated from the S-curve response in a manner according to this invention.

FIG. 7 shows a representative measured S-curve 90 response in which luminance is plotted versus input voltage for an arbitrary one of the R, G, or B colors transmitted by LCD array 40. In FIG. 7, the input voltage is shown as eight-bit input data values ranging from zero to 256, which drive a digital-to-analog converter ("DAC") that provides the input voltages to LCD array 40. A separate DAC is employed for each primary color. Of course, greater or fewer than 256 data values may be employed, but 256 are preferred.

Measuring the S-curve response entails sensing absolute luminance values of a primary color in response to a range of input data values driving LCD array 40, digitizing the sensed luminance values, and storing a sensed data value corresponding to each input data value. The process is repeated for each primary color. Preferably, a sampling of 64 uniformly separated data values is generated and sensed. Intermediate data values may be generated by frame rate conversion techniques to yield a total of 256 gray shades per color. Alternatively, intermediate sensed data values may be calculated using one of many well-known curve-fitting or interpolation algorithms.

Sensing the luminance values may employ an external detector such as a charge-coupled device camera or photometer that senses the luminance of the projection screen. Alternatively, an internal sensor, such as a photodetector, may be employed and mechanically positioned into a concentrated portion of the light path during the measuring period to integrate the total luminance to the projection screen. The internal photodetector may be adapted to make LCD projection units 12 automatically self-calibrating. External detectors typically require manual set up and calibration.

The measured response represented by S-curve 90 is stored as a set of 256 luminance data values that correspond to the 256 input data values. For example, referring again to FIG. 7, input data value 175 causes LCD array 40 to transmit about 0.84 of its maximum luminance. However, as described above, properly matching the response of LCD array 40 to video signal sources and to the human eye response requires converting S-curve 90 to a gamma corrected response 92. Therefore, when LCD array 40 is gamma corrected, input data value 175 should cause LCD array 40 to transmit about 0.42 of its maximum luminance.

Gamma correction is implemented by a processor (not shown) that converts each input data value used to generate S-curve 90 into a corresponding corrected input data value required to generate a corresponding gamma corrected luminance value. For example, the processor receives input data value 175, determines from gamma corrected response 92 that the gamma corrected luminance value is about 0.42, accesses the stored set of luminance values for S curve 90, and determines that corrected data value 130 corresponds to luminance value 0.42. The processor then loads corrected data value 130 into a lookup table at an address location 175. This process is repeated for each input data value until the lookup table stores a corrected data value for each possible input data value. Studying FIG. 7 reveals that the corrected input values are substantially the same as the input data values for input data values between zero and about 75, deviate substantially for input data values between about 75 and 250, and merge to substantially equality again at an input value of 256.

Luminance correction is also implemented by the processor and lookup table method. However, for luminance correction, the processor scales gamma corrected response 92 into a set of gain and gamma corrected responses 93–99 that have luminance responses ranging respectively from about 0.9 to about 0.5 of the corresponding luminance responses of gamma corrected response 92. For clarity, FIG. 7 shows a set of only eight gamma corrected responses, but 32 luminance responses are preferred ranging from about 0.98 to about 0.5 of the corresponding luminance responses of gamma corrected response 92. Then, as for gamma corrected response 92, the processor uses each of gain and gamma corrected responses 93–99 to load corresponding corrected data values into the lookup table for each input data value until the lookup table stores a corrected data value for each possible input data value and for each of gain and/or gamma corrected responses 92–99. The different sets of corrected data values may be accessed from the lookup table by conventional address offsetting, paging, or multiplexing techniques. This process is repeated for each primary color transmitted by LCD array 40.

After the above-described lookup table values are determined, they are preferably permanently stored in a read-only memory ("ROM") that "characterizes" the particular type of LCD array 40. The ROM may be duplicated and used in the manufacture of LCD projection units 12 that employ that particular type of LCD array 40. If the type or manufacturer of LCD array 40 is changed, a new set of lookup table values is determined and stored in a different ROM.

Using the ROM lookup tables, LCD projection unit 12N is adjusted to particular luminance and color balance values according to the following example. Because FIG. 7 shows only eight gain and/or gamma corrected responses (92–99), and the lookup tables contain 32 responses for each of the R, G, and B color, specific sets of lookup table values will hereafter be designated by color and number, e.g., R=1, R=2, ... R=32; G=1, G=2, ... G=32; and B=1, B=2, ... B=32.

The R, G, and B input data values are set to their maximum values (256 in this example).

Particular sets of lookup tables are interactively selected that cause the resulting displayed R, G, and B maximum values to generate a reference white color. An exemplary selected set may be R=32, G=30, and B=24. The resulting 32:30:24 ratio determines the selected color balance.

The luminance may be adjusted down from the maximum level by selecting different sets of lookup table values that track in the same 32:30:24 ratio. For example, LCD projection unit 12 may be adjusted to half luminance with the same color balance by selecting R=16, G=15, B=12.

The above described selections are preferably made manually by selecting among menu values generated by display controller 18 and displayed on the projection screen. Preferred menus showing the maximum and half luminance setting examples are represented below in Tables 1 and 2.

TABLE 1

| COLOR | VALUE |
|---|---|
| ALL | 32 |
| RED | 32 |
| GREEN | 30 |
| BLUE | 24 |

TABLE 2

| COLOR | VALUE |
|---|---|
| ALL | 16 |
| RED | 16 |
| GREEN | 15 |
| BLUE | 12 |

Initially, ALL, RED, GREEN, and BLUE have "32" entered as default values. The color balance values are preferably entered by typing 1–32 color values into the selected color dialog boxes. Various values are selected until the desired color balance is achieved. Alternatively, the values may be interactively selected using an infrared remote control unit, mouse and cursor, or keyboard direction arrow keys.

The luminance is next adjusted by typing into the ALL dialog box a desired relative value, e.g., 16. The RED, GREEN, and BLUE values are automatically scaled by the processor to maintain the selected color balance ratio.

The abovedescribed adjustment procedure may be repeated as needed to maintain the luminance and color balance values desired for LCD projection unit 12N. The procedure may need to be repeated more often when LCD projection unit 12N is in an array of LCD projection units 12 forming multiscreen display system 10.

Alternatively, the adjustment procedure may be implemented automatically by employing image sensors as described above. In multiscreen display system 10, automatic adjustment may further employ sensors in each of LCD projection units 12 that intercommunicate among associated display controllers 12 to achieve a luminance and color balance that is common to all LCD projection units 12. It is envisioned that such intercommunication would be RS-232 data communication among the processors employed to select from among the sets of lookup tables installed in each of LCD projection units 12.

FIG. 8 shows a preferred digital embodiment of a luminance and color balance controller of this invention. In this embodiment, eight bits each of R, G, and B digital input data are received from multiscreen display driver 16. A lookup table 100 stores the sets of gamma corrected data values described above. A controller 101, such as the above-described processor, is employed to manually or automatically select from among the sets of lookup tables. Lookup table 100 receives the R, G, and B, digital input data and converts it to corrected data values in accordance with the selected sets of lookup table values. A DAC 102 receives the corrected data values and provides corresponding voltages that are conditioned by an LCD driver amplifier 104 into R, G, and B input voltages received by LCD array 40. Preferably, DAC 102 and LCD drivers 104 are integrated in a commercially available package.

FIG. 9 shows an alternative analog embodiment of the luminance and color balance controller of this invention. In this embodiment, R, G, and B analog input voltages are received from multiscreen display driver 16. A gamma corrector 110 receives the analog input voltages and applies a nonlinear gain function to provide a gamma corrected input-to-output response substantially like gamma corrected response 92 of FIG. 7. A variable gain stage 112 receives the gamma corrected analog input voltages and provides for matching maximum R, G, and B gamma corrected input voltages to the reference color values. An S-to-linear converter 114 employs piecewise linear approximation to compensate for the characteristic S-curve response of LCD array 40. The resulting gamma, gain, and S-curve corrected input voltages are conditioned by LCD driver amplifier 104 into R, G, and B input voltages received by LCD array 40.

FIG. 10 shows an alternative hybrid analog/digital embodiment of the luminance and color balance controller of this invention. In this embodiment, R, G, and B analog input voltages are received from multiscreen display driver 16 and digitized by an analog-to-digital converter 120 into eight bits each of R, G, and B digital input data. The remainder of this embodiment is substantially the same as for the preferred embodiment of FIG. 8.

It will be obvious to those having skill in the art that many changes may be made to the details of the above-described embodiments of this invention without departing from the underlying principles thereof. Accordingly, it will be appreciated that this invention is also applicable to LCDs other than those found in multiscreen applications. The scope of the present invention should, therefore, be determined only by the following claims.

We claim:

1. A light modulator display apparatus including a color and luminance control system that compensates for display component transfer function-induced luminance and color variations by providing a substantially uniform overall transfer function of primary color input information to a spectral output having a predetermined luminance and a predetermined color balance ratio, comprising:

a light source providing primary color illumination in amounts establishing a light source luminance and an illumination color balance ratio;

a light modulator display device having a substantially nonlinear transfer function receiving the light source luminance and illumination color balance ratio and providing the spectral output in response to display driving signals;

a gain controller receiving the primary color information and providing gain-adjusted amounts of the primary color information to compensate for the illumination color balance ratio and establish the predetermined color balance ratio; and a light modulator display device transfer function converter receiving the gain-adjusted amounts of primary color information and providing the display driving signals in amounts that compensate for the nonlinear transfer function while maintaining in the spectral output the predetermined color balance ratio.

2. The apparatus of claim 1 in which the gain adjusted amounts of the primary color information further compensate for variations in the light source luminance and establish predetermined luminance information that is received by the light modulator display device transfer function converter to provide the display driving signals in amounts that produce in the spectral output the predetermined luminance while maintaining the predetermined color balance ratio.

3. The apparatus of claim 2 in which the predetermined luminance and the predetermined color balance ratio are independently adjustable without substantial interaction.

4. The apparatus of claim 1 in which the gain controller and the light modulator display device transfer function converter are embodied in at least one lookup table.

5. The apparatus of claim 1 in which the video input source is gamma corrected.

6. The apparatus of claim 1 in which the light modulator display device comprises a liquid crystal display.

7. The apparatus of claim 1 in which the light modulator display apparatus comprises a projection display.

8. The apparatus of claim 1 in which the light source includes a lamp assembly having one of a tungsten halogen lamp and a metal halide arc lamp.

9. The apparatus of claim 1 in which the primary color information includes red, blue, and green primary color information.

10. The apparatus of claim 1 in which the light modulator display device comprises a liquid crystal display and the light modulator display device transfer function converter includes a lookup table storing addressable values for compensating for S-curve characteristic responses of the liquid crystal display device.

11. The apparatus of claim 10 further including a digital-to-analog converter coupled to the lookup table for providing the display driving signals.

12. The apparatus of claim 1 in which the light modulator display device transfer function converter includes a piecewise linear conversion circuit for linearizing liquid crystal display device S-curve characteristic responses.

13. The apparatus of claim 1 which the gain controller includes a lookup table storing multiple sets of primary color information luminance correcting data.

14. The apparatus of claim 1 in which the gain controller includes controllable gain amplifiers.

15. The apparatus of claim 1 in which the light modulator display is one of an array of substantially similar light modulator displays employed in a multiscreen display stem.

16. In a light modulator display apparatus, a method of compensating for display component transfer function-induced luminance and color variations by providing a substantially uniform overall transfer function of primary color input information to a spectral output having a predetermined luminance and a predetermined color balance ratio, the method comprising:

providing primary color illumination in amounts establishing a light source luminance and an illumination color balance ratio;

receiving the light source luminance and illumination color balance ratio at a light modulator display device having a substantially nonlinear transfer function and providing the spectral output in response to display driving signals;

providing gain-adjusted amounts of the primary color information to compensate for the illumination color balance ratio and establish the predetermined color balance ratio; and receiving the gain-adjusted amounts of primary color information and providing the display driving signals in amounts that compensate for the nonlinear transfer function while maintaining in the spectral output the predetermined color balance ratio.

17. The method of claim 16 in which the providing gain adjusted amounts of the primary color information further includes compensating for variations in the light source luminance and establishing predetermined luminance information that provides the display driving signals in amounts that produce in the spectral output the predetermined luminance while maintaining the predetermined color balance ratio.

18. The method of claim 17 further including independently adjusting the predetermined luminance and the predetermined color balance ratio.

19. The method of claim 16 in which the light modulator display device comprises a liquid crystal display.

20. The method of claim 16 which the light modulator display apparatus comprises a projection display.

21. The method of claim 16 in which the light modulator display is one of an array of substantially similar light modulator displays employed in a multiscreen display system.

* * * * *